United States Patent [19]

Ropars et al.

[11] Patent Number: 4,525,573
[45] Date of Patent: Jun. 25, 1985

[54] THERMOSET POLYMERS AND PREPOLYMERS OBTAINED BY POLYCONDENSATION OF ALKYL PYRIDINE WITH HYDROXYL AROMATIC MONOALDEHYDES

[75] Inventors: Marcel Ropars, Rocquen Court; Bertrand Bloch, Paris, both of France

[73] Assignees: Societe Nationale des Poudres et Explosifs, Paris; Office National d'Etudes et de Recherches Aerospatiales, Bagneux, both of France

[21] Appl. No.: 644,195

[22] Filed: Aug. 24, 1984

[30] Foreign Application Priority Data

Sep. 13, 1983 [FR] France .................................. 83 14546

[51] Int. Cl.³ .............................................. C08G 12/08
[52] U.S. Cl. .................................... 528/232; 264/137; 264/331.22; 427/290; 528/237; 528/238; 528/242; 528/245; 528/266; 528/269; 528/302

[58] Field of Search ............... 528/232, 237, 238, 242, 528/245, 266, 269; 264/137, 331.22; 427/290

[56] References Cited

U.S. PATENT DOCUMENTS 3,994,862  11/1976  Ropars et al. ................. 528/269 X
4,362,860  12/1982  Ratto et al. ..................... 528/269 X

*Primary Examiner*—Lucille M. Phynes
*Attorney, Agent, or Firm*—Bucknam and Archer

[57] ABSTRACT

The object of the invention are new thermoset polymers and prepolymers, a process for their preparation, and their uses. The new thermoset prepolymers consist, at least in part, of the polycondensation products of one or more pyridine derivatives containing at least two activated methyl groups with one or more aromatic monoaldehydes containing at least one hydroxyl group. These prepolymers are used to prepare composite materials, in particular laminates, that can be used at high temperatures.

18 Claims, No Drawings

THERMOSET POLYMERS AND PREPOLYMERS OBTAINED BY POLYCONDENSATION OF ALKYL PYRIDINE WITH HYDROXYL AROMATIC MONOALDEHYDES

The invention relates to new thermoset polymers and prepolymers derived from alkyl pyridines, in particular methyl pyridines, and aromatic aldehydes, and to their preparation and uses.

Dimethyl and trimethyl derivatives of pyridine have already been reacted with aromatic dialdehydes, which results in condensation between each aldehyde group and one of the methyl groups situated in the nitrogen-containing aromatic heterocyclic pyridine ring. This condensation reaction takes place when the afore-mentioned methyl group is situated in a position on the aromatic ring where it is activated by the nitrogen atom. This condition exists for example in the 2-, 4- and 6-positions of the pyridine ring.

This condensation reaction, which results in the formation of a bond between the radicals of the pyridine derivative and the aromatic dialdehyde via an ethylenic group, constitutes the basis for the synthesis of a family of thermoset prepolymers identified hereinafter as "PSP resins". These resins, which have a high thermal stability and are ideally suitable for use as matrices for fibre-reinforced composite materials having good mechanical properties, particularly at high temperatures (up to 450° C., the working life obviously depending on the temperature), are obtained for example by condensing 2,6-dimethylpyridine (2,6-lutidine), 2,4-dimethylpyridine (2,4-lutidine) or 2,4,6-trimethylpyridine (2,4,6-collidine) with aromatic dialdehydes such as terephthaldehyde. Such resins have been described in particular in French Patent Nos. 2 261 296 and 2 261 297.

The condensation reaction may be written as follows:

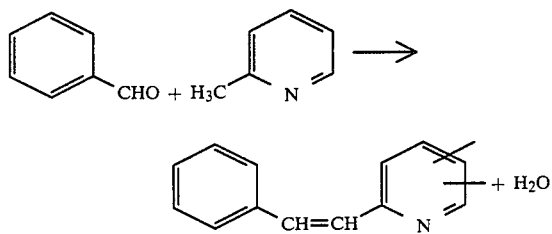

The inventors have found that, by reacting a polymethylated pyridine derivative containing at least two methyl groups respectively on at least two of the 2, 4 or 6 positions (that is to say containing at least two activated methyl groups) with an aromatic monoaldehyde, a resin is obtained, which is a surprising result since one would have expected that the use of a monoaldehyde in place of a dialdehyde would make it impossible to form bridges in the condensation product, and that therefore the reaction between a polymethylated pyridine derivative and a monoaldehyde would not result in a resin.

However, the inventors obtain a resin by condensing a polymethylated pyridine derivative containing at least two activated methyl groups with benzoic aldehyde. Even more surprisingly, the inventors obtain a thermoset resin by condensing a polymethylated pyridine derivative containing at least two activated methyl groups with an aromatic monoaldehyde containing at least one hydroxyl group, such as o-hydroxybenzaldehyde (salicylaldehyde).

The object of the invention are thus new prepolymers or resins consisting, at least in part, of the products of the polycondensation of one or more pyridine derivatives containing at least two activated methyl groups and one or more aromatic monoaldehydes containing at least one hydroxyl group.

The prepolymers or resins of the invention have a thermostability substantially equivalent to that of the PSP resins defined above. Accordingly, the starting temperatures of thermal decomposition mesured by thermogravimetric analysis in an inert atmosphere are practically identical for both families of products, and are close to 300° C.

However, the resins of the invention have a certain number of advantages, as mentioned hereinafter, compared with the PSP resins.

Thus, the resins according to the invention may be synthesized from aldehydic compounds more readily available than aromatic dialdehydes, in particular terephthaldehyde, which is the preferred starting aldehyde used to prepare PSP resins; this is particularly the case when salicylaldehyde is used, which is one of the preferred monoaldehydes used to prepare the resins according to the invention.

Another advantage of the resins according to the invention is that they have solubility characteristics at least equivalent to those of the PSP resins, in particular in the presence of light ketone-type solvents currently used in fibre impregnation operations. The advantage in this case is particularly the fact that it is possible, during the synthesis of the resins according to the invention, to continue the polycondensation up to a sufficiently advanced degree of conversion so that the resultant resins contain only a small proportion of starting reactants, whose smell may possibly prove to be disagreeable during the subsequent transformation operations, while preserving the fusibility and solubility characteristics enabling the said resins to be used.

Finally, another important advantage of the resins of the invention compared with PSP resins is that a better preservation of the mechanical properties is ensured during high temperature ageing in the case of composite materials whose reinforcement consists of crossed unidirectional layers or woven fabric plies. This aspect will be illustrated and exemplified in more detail in the following Examples.

The prepolymers or resins according to the invention may be prepared by a process consisting of reacting at least one pyridine derivative containing at least two activated methyl groups with an aromatic monoaldehyde containing at least one hydroxyl group.

The pyridine derivatives containing at least two activated methyl groups that are advantageously used are 2,4-dimethylpyridine (2,4-lutidine), 2,6-dimethylpyridine (2,6-lutidine), or 2,4,6-trimethylpyridine (collidine).

These pyridine derivatives containing at least two activated methyl groups may be used individually or mixed or in the presence of isomers or compounds of the family of alkyl pyridines; the latter compounds entering into the composition of the afore-mentioned methylpyridines are normally commercially available.

By aromatic monoaldehydes containing at least one hydroxyl group are understood all compounds having one or more aromatic ring with an aldehyde group and at least one hydroxyl group. The preferred aromatic monoaldehydes of the invention are benzene derivatives containing one or two hydroxyl groups. O-hydroxybenzaldehyde or p-hydroxybenzaldehyde, alone or mixed, is advantageously used.

M-hydroxybenzaldehyde may also be used.

According to one embodiment of the invention, it is also possible for an aromatic dialdehyde, such as phthalic aldehyde, isophthalic aldehyde or terephthalic aldehyde, alone or as a mixture, to take part in the condensation reaction.

The pyridine derivatives containing at least two activated methyl groups and the aromatic monoaldehydes may be used in proportions corresponding to the reaction of about one aldehyde group per activated methyl group.

Advantageously, about 1 to 2 moles of monoaldehyde containing at least one hydroxyl group are used per mole of pyridine derivative containing at least two activated methyl groups. When an aromatic dialdehyde is used, up to about 0.5 mole of aromatic dialdehyde may be used per mole of pyridine derivative containing at least two activated methyl groups.

The condensation reaction is advantageously carried out by heating the mixture of the reactants to a temperature between about 175° and about 215° C., generally at the reflux temperature of the mixture under the operating pressure, and preferably in the presence of a catalyst capable of promoting the condensation between the carbonyl group of the aromatic monoaldehyde and a methyl substituent of pyridine, and capable of accelerating the reaction so as to bring it to completion within a period ranging from about one hour to several hours.

The heating is continued until a viscous liquid is obtained, the reaction time depending on the desired degree of viscosity, the nature of the starting products, and the nature and amount of the catalyst.

Moreover, the reaction is advantageously carried out under an inert atmosphere so as to protect the reactants from atmospheric oxidation. As regards the pressure, atmospheric pressure is generally sufficient but it is often preferred to apply a slight excess pressure in order to increase the reaction temperature.

When the condensation is carried out under a constant pressure, in particular atmospheric pressure, it is found that the reflux temperature of the reaction mixture, and consequently the reaction temperature itself, falls progressively as the reaction proceeds due to the formation of water in the condensation reaction. It is thus possible to increase the boiling point and thereby accelerate the reaction by eliminating this water as it is formed, by azeotropic distillation.

Another way of increasing the reaction temperature is to operate under a slight excess pressure, which enables the boiling point to be raised without having to eliminate the water of condensation. It has been found furthermore that the presence of this water in the prepolymer does not adversely affect its subsequent use and is not detrimental to the properties of the resins after curing.

A dehydrating agent such as acetic anhydride may also advantageously be used in an amount roughly stoichiometrically equivalent to the amount of water than can be eliminated, which promotes the reaction and may make the addition of a catalyst superfluous.

Widely different substances may be used as catalysts. Compounds capable of reducing the electron density of the nitrogen atom of methylated pyridines, and possibly of conferring on the nitrogen atom a positive electrical charge by protonation, complexation or quaternarisation, may advantageously be used. For this reason strong mineral or organic protonic acids such as sulphuric acid are advantageously used. P-toluenesulphonic acid is particularly preferred on account of its good solubility in the reaction media and in the prepolymers obtained at the end of the condensation reaction. Reactants conventionally called "Lewis acids", such as aluminium chloride, zinc chloride or tin fluoride, may also be used.

Other substances may also be employed in order to accelerate the reaction, for example methyl iodide and benzyl chloride, which are capable of forming quarternary ammonium derivatives with the pyridine base.

The use of such catalysts is not absolutely essential, but enables the reaction time to be reduced. The amount of catalyst used is preferably of the order of 0.5 to 10 mole % with respect to the pyridine compounds.

In order to prepare the prepolymers according to the invention, all the necessary reactants may be added at the start of the reaction.

However, a preferred way of carrying out the process for obtaining the prepolymers of the invention consists of adding, continuously or in batches, one or other of the two used reactants to the totality of the other, the latter being kept at the operating temperature. This enables the course of the reaction to be controlled more satisfactorily.

In general the condensation reaction is carried out without the addition of solvent. However, an inert solvent having a sufficiently high boiling point, preferably above 150° C., may also be used when the reaction is carried out at atmospheric pressure, so that the temperature of the reaction medium is not limited by the boiling of this solvent.

As solvents there may be used a member of the so-called aprotic dipolar family (dimethylformamide, N-methylpyrrolidone, dimethyl acetamide, hexamethyl phosphorotriamide, a chlorinated solvent (tetrachloroethane), or a ketone having a boiling point above 150° C., such as cyclohexanone.

By controlling the degree of the polycondensation, the resins or prepolymers of the invention may, at ambient temperature and according to the requirements, be in the form of more or less viscous liquids or vitreous solids, of a pale yellow colour, which melt at a moderate temperature (less than about 100° C.) and are soluble in conventional light solvents of alcohol or ketone type, of thereof mixture such as for example, ethanol, propanol, ketoalcohol solvents based on acetone or methyl ethyl ketone, dipolar aprotic solvents, and certain chlorinated solvents (chloroform, dichloroethane, tetrachloroethane).

The solid form represents the preferred state of the prepolymers of the invention to the extent that as has already been mentioned previously, it is possible to achieve a high level of polycondensation without any serious risk of gelling or premature loss of solubility. The advantages resulting from a resin having a high degree of condensation are essentially due to its reduced concentration of volatile substances that can be eliminated during heat curing treatments, and also from the possibility of being able to perform moulding operations at temperatures which are lower the greater the degree of condensation.

The time required to achieve gelling is, in fact, at a given temperature inversely proportional to the degree of condensation of the resin, which is why, for one of the preferred prepolymers prepared from collidine and salicylic aldehyde, the gelling temperature may vary between about 0.5 and about 3 hours at about 200° C., depending on the degree of condensation; this fact will in this latter case, be an incentive to carry out the moulding preferably at a high temperature so as to maintain a reasonable operation time.

The prepolymers may be employed using the various conventional techniques applicable to thermoset resins. Prepolymers in powder form lend themselves in particular to forming and shaping by pressure moulding, but they may also be dissolved in a solvent, or melted.

In all cases the prepolymer is advantageously cured by heat treatment at a temperature between about 200° and about 300° C. An infusible and insoluble polymer is finally obtained. This polymer has an excellent thermal stability.

The resins according to the invention are capable of numerous applications where their good mechanical properties at high temperatures may be utilised. However, the invention covers more particularly their application in the fabrication of composite materials, in particular laminates. The latter are manufactured in a conventional manner by impregnating fibres, more particularly glass or carbon fibres in tufts, large strips or woven structures, with one of the resins of the invention used as such in the hot state, or dissolved at ambient temperature. These intermediate pre-impregnated materials may then be moulded, between about 200° and about 255° C. depending on the case, and then made completely infusible by post-curing at about 250° or about 300° C.

The resins according to the invention may also be used to impregnate short fibers and to prepare moulding powders.

The composite materials obtained from the resins according to the invention can withstand high temperatures of the order of 250° C. for a prolonged period, for example about 500 to about 1000 hours, without there being any fear of an appreciable reduction in their mechanical properties, even if their reinforcement is of the crossed layer or woven type, whereas in the case of PSP resins the mechanical properties degrade fairly rapidly under the afore-mentioned time and temperature conditions.

The invention will now be described in more detail within the scope of particular examples of carrying out of the invention.

EXAMPLE 1

Preparation of a p-hydroxybenzaldehyde-collidine resin 2 moles of 99% pure collidine (marketed by Erba), 4 moles of p-hydroxybenzaldehyde, and 3.7% of p-toluenesulphonic acid, the percentages being expressed in moles per moles of collidine, are added to a 1 liter reactor equipped with a device for flushing with an inert gas, and a reflux condenser, a system for the continuous collecting of the water formed during the reaction, a stirrer, and a thermometer.

The reaction mixture is heated under reflux for 1.5 hours; during this treatment the temperature of the reaction medium rises from 180° to 200° C. and at the end of this period about 80% of the water that would theoretically be formed in a complete reaction is collected.

After cooling the obtained prepolymer is at a solid state, and is progressively softened between 40° and 80° C. This prepolymer is soluble in ethanol, propanol and in keto-alcoholic mixtures based on acetone or methyl ethyl ketone. Its heat curing at 250° C. is accompanied by a weight loss of about 10%.

Fabrication of a laminate reinforced with glass fabric

A 50% resin solution is made up with a mixture of methyl ethyl ketone and propanol (75/25). An "E" glass fabric (Stevens-Genin 1581 having an A 1100 "finish") is impregnated at ambient temperature to an impregnation level of about 65%.

A pre-impregnated fabric having adhesive and drapability qualities suitable for making laminates, with a content of residual volatile substances of the order of 10%, is obtained by the removal of most of the solvent, at 100° C. during 15 minutes.

After cutting, the plies of pre-impregnated fabric are stacked in a mould provided with walls; the mould is then closed by a die placed on wedges or supports having a thickness slightly greater than that of the stack so as to prevent the pre-impregnated material drying out during the first stage of moulding. The stack is then placed between the plates of a press preheated to 200° C. The wedges are removed after 30 minutes at this temperature and a pressure of 10 bars is then applied. After a total residence time of 3 hours at 200° C., the temperature of the mould is raised to 250° C. and maintained at this value for 2 hours. The mould is cooled under pressure.

In order to confer the maximum mechanical properties at high temperature on the laminate thus obtained, it is necessary to subject the latter to a thermal post-treatment during 16 hours at 250° C. This treatment is carried out in a confined atmosphere on previously cut test samples according to the ASTM norms of flexural tests and induced interlaminar shearing.

Mechanical properties of the laminates

The rupture strength under flexion and under interlaminar shearing at 20° and 250° C. were determined according to the afore-mentioned ASTM norms for a laminate fabricated according to the afore-described technique and having a degree of reinforcement of about 60% by volume, in comparison with the measurement of strength values for a similar material likewise reinforced with E glass fabric and produced from a commercial PSP resin (type 6022 M produced by SNPE). For both materials the tests were carried out after 100 hours' and 500 hours' ageing at the same temperature.

TABLE I

| Treatment at 250° C. | | Resin of the invention | | | PSP Resin | |
|---|---|---|---|---|---|---|
| | | 16 hrs. | 100 hrs. | 500 hrs. | 16 hrs. | 100 hrs. |
| Flexion at | 20° (MPa) | 660 | 550 | 240 | 450 | 200 |
| | 250° (MPa) | 420 | 430 | 200 | 400 | 250 |
| Shearing at | 20° (MPa) | 52 | 53 | 21 | 35 | 20 |
| | 250° (MPa) | 45 | 30 | 20 | 30 | 20 |

The advantages resulting from the use of one of the resins of the invention are manifested very clearly in the light of these results, namely an improvement of about 40 to 50% of the initial properties and, on thermal ageing, an identical degree of preservation of the mechanical performances after a period five times as long.

EXAMPLE 2

Preparation of a o-hydroxybenzaldehyde (salicylaldehyde)/collidine resin by introducing two moles of aldehyde per one mole of collidine at the start of the reaction One more of salicylaldehyde, half a mole of collidine and, as catalyst, 1.8% of p-toluenesulphonic acid in moles with respect to the collidine are added to a 250 ml reactor equipped as in Example 1.

The mixture heated under reflux (initial temperature 180° C.) provides, after 1½ hours, 20% of the water of polycondensation expected for the complete reaction, which collects at the base of the reflux collector. As the boiling vapours are enriched in salicylaldehyde whose density is greater than that of water after this period, a separation of aqueous and organic phases in the collector is no longer obtained. During the next 4 hours water is no longer collected, thus the reaction temperature progressively lowers to 150° C.

After a total time of 5½ hours the aqueous phase, which is then at the top of the collector, may be collected, which produces a progressive rise in the temperature to 210° C. after a total time of 7½ hours. The reaction is then finally stopped.

The total collected amount of water is then 45% of the theoretical amount for the complete reaction; the obtained resin is, at ambient temperature, a reddish-brown solid which is cured with the elimination of 15% of volatiles and is readily soluble in an amount of 900 g/l in methyl ethyl ketone, thus enabling impregnation solutions for fibre reinforcements to be obtained. Its gelling time at 225° C. is of the order of 50 minutes, and it is therefore substantially less reactive than the resin of Example 1.

Fabrication of a laminate reinforced with carbon fabric

A Toray carbon fibre fabric, 300 B (Stevens-Genin 43377) is impregnated with the afore-described solution under the same conditions as in Example 1, and a partial drying of 8 to 10 minutes at 100° C. provides a pre-impregnated material having satisfactory drapability and adhesive properties.

After cutting, the pre-impregnated plies are arranged in a mould identical to that of Example 1 and wedges separating the pile from the die are put in place. The whole arrangement is heated to 225° C. between the plates of a press. Gelling of the resin at this temperature takes place between 35 and 50 minutes, and the wedges are removed after 20 minutes, following which a pressure of 12 bars is applied progressively over 15 minutes. After a total time of 3 hours at 225° C., the temperature is raised to 250° C. for 2 hours and cooling is carried out under pressure while slowly decreasing the temperature.

The laminate obtained contains 60% by volume of fibres and has a porosity of the order of 2.5%.

Mechanical and thermal properties of the laminate

On the account of the weakest reactivity of the resins derived from salicylaldehyde, a post-treatment for 100 hours at 250° C. without the application of pressure (or 3 hours at 300° C.), in place of the 16 hours for the resin of Example 1, is necessary in order to obtain the maximum thermostability of the composite. Its flexural strength is then 600 MPa at ambient temperature and 575 MPa at 250° C.; its interlaminar shear strength between joined supports is 28 MPa at ambient temperature and 25 MPa at 250° C. After 1000 hours at 250° C., the reaction of these properties is 60% in the case of flexion and 80% in the case of shearing; the bending test specimens have then lost 8% of their weight.

The advantage of using the new resins as laminate matrices reinforced with woven carbon fabric is made more clear by examining Table II, where these results are given by comparison with those obtained from a similar laminate but whose matrix consists of PSP resin (type 6022 M manufactured by SNPE).

EXAMPLE 3

Preparation of a salicylaldehyde/collidine resin with progressive introduction of collidine One mole of salicylaldehyde and the same amount of p-toluenesulphonic acid as in Example 1 is added to the apparatus described in Example 1. An amount of technical collidine sold under the trademark "Rütgers" (93% of reactive methylpyridines) corresponding to one half mole of reactive methylpyridines, is added drop-by-drop from a dropping funnel mounted on the reactor. This addition lasts 3½ hours, during which 40% of the water that should be obtained by the complete polycondensation is collected; this water constantly forms the upper phase in the collector and the reaction temperature remains constant at around 195° C. On continuing the reaction for one hour the temperature rises to 210° C. and the amount of collected water then rises to 60%. The total time of the synthesis is thus 4½ hours, following which the resin, which is solid at ambient temperature and has an appearance similar to that of Example 2, also releases 15% of volatiles during curing, but its gell chromatography indicates the presence of 20% of compounds having a total molar mass greater than 3000, while the resin of Example 2 contains only 5% of such compounds. This higher degree of condensation is reflected in a reduction in the gelling time which is no more than 1 hour 20 minutes at 200° C., however, its solubility in methyl ethyl ketone for the purposes of obtaining a cold impregnation solution remains excellent.

Fabrication of a laminate reinforced with carbon fabric

The impregnation of the same reinforcement as in Example 2 is carried out under the same conditions as well as partial drying.

Due to the reasonable gelling time at 200° C., the press moulding is carried out at this temperature.

The wedges are removed after 1 hour at 200° C., the pressure is progressively raised to 12 bars after 1 hour 15 minutes, the temperature is raised to 250° C. after 3 hours at 200° C., and the reaction is stopped, with slow cooling under decreasing pressure after 2 hours at 250° C.

Mechanical and thermal properties of the laminate

For this more codensed resin, a post-treatment during only 16 hours at 250° C. is sufficient to obtain mechanical and thermal properties identical to those of the laminate of Example 2.

EXAMPLE 4

Preparation of a salicylaldehyde/collidine resin with progressive addition of aldehyde The amount of technical collidine required to have one half mole of reactive methylpyridines and the same amount of p-toluenesulphonic acid as in Example 3 are added to the reactor of the apparatus described in Example 3. One mole of salicylaldehyde is added to a dropping funnel, and flows drop-by-drop into the reflux mixture over 3½ hours. During this time the temperature rises from 175° to 195° C., the water settles in the lower part of the collector, and 40% of the theoretical amount of water formed in the complete reaction is collected. The synthesis is continued for one hour. Moreover, during the synthesis the temperature rises to 215° C. The total time of the synthesis is thus 4½ hours, the total amount of water collected represents 80% of the theorical amount for a complete condensation, and the resin obtained, which is solid at ambient temperature, releases 20% of volatiles on curing and contains 12% of compounds having a molecular weight greater than 3000. Here too, this degree of condensation higher than for the resin of Example 2 is reflected by a shorter gelling time, of 1½ hours at 200° C.

Fabrication of a laminate reinforced with carbon fabric

The dissolution procedure, impregnation and partial drying of the pre-impregnate are the same as in Example 3.

Moulding may be performed either at 200° C. (removal of the wedges after 1 hour 10 minutes and after 1 hour 25 minutes under 12 bars) or at 225° C. (removal of the wedges after 15 minutes and after 30 minutes under 12 bars). In both cases the temperature at which the pressure is applied is maintained for 3 hours and is then raised to 250° C. and maintained thereat for 2 hours.

The mechanical properties and performances are can be removed in the first 5 hours. In the next half hour no more water can be removed, but then between 7 and 8½ hours of reaction time, it may be collected at the top of the collector; the total amount of water removed is 75% of the theoritical amount. The resin has the appearance of the previous resins, and is solid at ambient temperature. It is soluble in methyl ethyl ketone, releases 15% of volatiles on curing, and contains 25% of compounds having a molecular weight above 3000. Its gelling time is 45 minutes at 225° C.

Fabrication of a laminate reinforced with carbon fabric

The dissolution procedure, impregnation and partial drying are the same as in Examples 2 to 4.

Moulding is carried out at 225° C. with removal of the wedges after 5 minutes and progressive application of a pressure of 12 bars in 15 minutes. The moulding cycle is 3 hours at 225° C. and 2 hours at 250° C.

Mechanical and thermal properties of the laminate

After 100 hours' heating at 250° C., a laminate containing 60% by volume of reinforcement has a flexural strength of 800 MPa at ambient temperature and of 600 MPa at 250° C. The laminate also has a shear strength of 33 MPa at ambient temperature and of 30 MPa at 250° C. After 1000 hours' thermal ageing at 250° C., the flexural strength at ambient temperature and at 250° C. is 400 MPa, with a weight loss of the test specimens of 7%. The shear strength is 25 MPa at ambient temperature and 20 MPa at 250° C. These latter results are also shown in Table II, which enables these results to be compared with those obtained with a PSP resin.

TABLE II

COMPARATIVE MECHANICAL AND THERMAL PROPERTIES OF LAMINATES REINFORCED WITH T 300B CARBON FABRIC WITH DIFFERENT MATRICES

| Measurements | PSP 6022 M resin | | | | Salicylaldehyde/ collidine resins | | | | Salicylaldehyde/ 2,6-lutidine resins | | | |
|---|---|---|---|---|---|---|---|---|---|---|---|---|
| | | | 1000 h/250° | | | | 1000 h/250° | | | | 1000 h/250° | |
| | NR[1] | R[2] | $\sigma$ | $\frac{\Delta m}{m}$ [4] | NR | R | $\sigma$ | $\frac{\Delta m}{m}$ | NR | R | $\sigma$ | $\frac{\Delta m}{m}$ |
| Flexural strength (MPa) | | | | | | | | | | | | |
| 20° | 860 | 600 | 120 | 12% | 650 | 560 | 330 | 8% | 620 | 800 | 400 | 7% |
| 250° | 550 | 600 | 100 | | 150 | 530 | 300 | | 100 | 580 | 380 | |
| Shear strength (MPa) | | | | | | | | | | | | |
| 20° | 50 | 30 | 10 | | 30 | 25 | 20 | | 38 | 33 | 25 | |
| 250° | 30 | 30 | 10 | | 7 | 25 | 20 | | 7 | 30 | 20 | |

[1] NR: not recured
[2] R: recured
[3] $\sigma$: breaking strength
[4] $\frac{\Delta m}{m}$ : weight loss of the sample substantially the same as those for the laminates of Examples 2 and 3.

EXAMPLE 5

Preparation of a salicylaldehyde/2,6-lutidine resin

One mole of salicylaldehyde, one half mole of 2,6-lutidine and the same amount of catalyst as in Examples 2 to 4 are added in succession to the apparatus of Example 2 containing a 250 ml reactor. The mixture is maintained under reflux for 7 hours, during which the temperature rises from 175° to 215° C. The water of polycondensation constitutes the lower layer during the first time of the reaction and 40% of the theoretical amount

We claim:

1. Thermoset prepolymers wherein they consist, at least in part, of the polycondensation reaction products of one or more pyridine derivatives containing at least two activated methyl groups in the 2, 4, 6-positions with one or more aromatic monoaldehydes containing at least one hydroxyl group.

2. Prepolymers according to claim 1, wherein an aromatic dialdehyde takes part in the polycondensation.

3. Prepolymers according to claim 1, wherein the pyridine derivative is selected from 2,4,6-trimethylpyridine, 2,4-dimethylpyridine or 2,6-dimethylpyridine.

4. Prepolymers according to claim 1 wherein the aromatic monoaldehyde contains one or two hydroxyl groups.

5. Prepolymers according to claim 4 wherein the aromatic monoaldehyde is selected from o-hydroxybenzaldehyde, m-hydroxybenzaldehyde or p-hydroxybenzaldehyde.

6. Prepolymers according to claim 2 wherein the aromatic dialdehyde is selected from phthalic aldehyde, isophthalic aldehyde or terephthalic aldehyde.

7. Prepolymers according to claim 1 wherein they are in the form of viscous liquids soluble in solvents such as alcohol or ketone type solvents, in particular ethanol, propanol, butanol, acetone, methyl ethyl ketone, methyl isobutyl ketone, alone or as a mixture; solvents of the dipolar aprotic type, in particular dimethylformamide, dimethylacetamide, N-methyl-pyrrolidone, and chlorinated solvents, in particular chloroform, 1,2-dichloroethane, and 1,1,2,2-tetrachloroethane.

8. Prepolymers according to claim 1 wherein they are in the form of fusible vitreous solids and are soluble in solvents such as solvents of the alcohol or ketone type, in particular ethanol, propanol, butanol, acetone, methyl ethyl ketone, methyl isobutyl ketone, alone or mixed; solvents of the dipolar aprotic type, in particular dimethylformamide, dimethylacetamide, N-methylpyrrolidone, and chlorinated solvents, in particular chloroform, 1,2-dichloroethane, and 1,1,2,2-tetrachloroethane.

9. Process for preparing polymers according to claim 1, wherein a pyridine derivative containing at least two activated methyl groups in the 2, 4, 6-positions, in particular 2,4,6-trimethylpyridine, is reacted with an aromatic monoaldehyde containing at least one hydroxyl group, in particular salicylaldehyde.

10. Process for preparing prepolymers according to claim 9, wherein it consists of reacting respective amounts of pyridine derivative containing at least two activated methyl groups and aromatic monoaldehyde corresponding to the presence of about one aldehyde group per one activated methyl group, at a temperature between about 175° C. and about 215° C., preferably at the reflux temperature of the reaction mixture, until a viscous liquid or a vitreous solid is obtained.

11. Process according to claim 9, wherein about 1 to about 2 moles of aromatic monoaldehyde and about 0 to 0.5 mole of aromatic dialdehyde are reacted per 1 mole of pyridine derivative.

12. Process according to claim 9 wherein it comprises, in addition, the addition of a catalyst for the polycondensation reaction of an aromatic monoaldehyde with a pyridine derivative containing activated methyl groups, such as sulphuric acid, p-toluenesulphonic acid, aluminium chloride, zinc chloride, tin fluoride, methyl iodide or benzyl chloride, used in an amount of about 0.5 to about 10 mole % with respect to pyridine.

13. Process according to claim 9, wherein the polycondensation reaction is carried out in the presence of a dehydrating agent such as acetic anhydride.

14. Process according to claim 9, wherein the polycondensation reaction is carried out in an inert solvent whose boiling point is preferably greater than 150° C., such as a dipolar aprotic solvent, a chlorinated solvent, or a ketone having a boiling point greater than 150° C.

15. Process for preparing new polymers, wherein prepolymers according to claim 1 are shaped and formed by any known process, in particular by moulding the prepolymers in the liquid state, if necessary dissolved in a solvent, or by pressure moulding of prepolymers in powder form, and in that the resultant products are cured by a heat treatment at a temperature of the order of 200° to 300° C.

16. Process according to claim 15, wherein the curing heat treatment comprises maintaining a shaped or formed prepolymer at a temperature of the order of 200° C., before subsequent heating at above 220° C.

17. Use of the prepolymers according to claim 1 for producing composite materials, in particular laminates, by impregnating fibrous materials with the said prepolymers and curing the thus impregnated fibre materials under pressure.

18. Composite materials, in particular in the form of laminates, consisting of fibres such as carbon fibres and prepolymers according to claim 1.

* * * * *